US006502997B1

(12) United States Patent
Lee et al.

(10) Patent No.: US 6,502,997 B1
(45) Date of Patent: Jan. 7, 2003

(54) CONNECTOR AND CABLE HAVING TRANSDUCER AND RECEIVER FOR OPTICAL TRANSMISSION

(75) Inventors: Bang Won Lee, Seongnam (KR); Kim Do Hwi, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/522,426

(22) Filed: Mar. 9, 2000

(30) Foreign Application Priority Data

Mar. 10, 1999 (KR) .............................. 99-7914
Oct. 21, 1999 (KR) .............................. 99-45857

(51) Int. Cl.⁷ ................................. G02B 6/36
(52) U.S. Cl. ..................... 385/88; 385/89; 385/90
(58) Field of Search ..................... 385/90, 92, 88, 385/89

(56) References Cited

U.S. PATENT DOCUMENTS

| | | | | |
|---|---|---|---|---|
| 4,767,168 A | * | 8/1988 | Grandy .................... | 385/92 |
| 4,863,233 A | | 9/1989 | Nienaber et al. .......... | 350/96.2 |
| 5,488,682 A | * | 1/1996 | Sauter ..................... | 385/89 |
| 5,751,534 A | * | 5/1998 | DeBalko ................... | 361/119 |
| 6,294,908 B1 | * | 9/2001 | Belmore ................... | 324/158.1 |
| 6,311,149 B1 | * | 10/2001 | Ryan ...................... | 703/21 |

FOREIGN PATENT DOCUMENTS

| | | | | |
|---|---|---|---|---|
| EP | 0174099 | 8/1985 | ......... | G06F/3/153 |
| JP | 9-913197 | 9/1995 | ......... | G06K/19/07 |
| KR | 99-48668 | 7/1999 | ............. | G06F/1/16 |
| WO | WO99/13459 | 3/1999 | ............. | G11B/5/39 |

OTHER PUBLICATIONS

"Telecommunications media", Encyclopedia Britannica (Online).*

* cited by examiner

Primary Examiner—Cassandra Spyrou
Assistant Examiner—Leo Boutsikaris
(74) Attorney, Agent, or Firm—Mills & Onello, LLP

(57) ABSTRACT

An optical fiber connector and cable having a transducer and a receiver for optical transmission is provided. The optical fiber connector includes an optical fiber cable, and first and second connectors. The first connector has a transducer for controlling data transmission, and is connected to one end of the optical fiber cable. The second connector has a receiver for controlling data reception, and is connected to the other end of the optical fiber cable. The first and second connectors are inserted into coaxial cable connectors which are respectively connected to an external transmission interface unit and an external reception interface unit. According to the connector and cable, a transducer and a receiver which are used for optical fiber cable transmission are installed in a connector of an optical fiber cable. Therefore, the connector and optical cable are compatible with digital data transmission systems which exclusively use a coaxial cable. Further, an interface system between a computer and multiple peripheral apparatus uses an optical fiber cable rather than a coaxial cable as a transmission cable, so that the data transmission speed and the performance can be improved.

4 Claims, 6 Drawing Sheets

CONNECTOR AND CABLE HAVING TRANSDUCER AND RECEIVER FOR OPTICAL TRANSMISSION

BACKGROUND OF THE INVENTION

1. Field of the Invention

The present invention relates to digital data transmission systems, and more particularly, to a connector and cable having a transducer and a receiver for optical transmission.

2. Description of the Related Art

Contemporary digital data transmission systems transmit data utilizing generally a coaxial cable, a copper cable or an optical fiber cable as a transmission medium. However, transmission of digital data via a coaxial cable or a copper cable suffers from limitations, as compared to optical fiber cable transmission. First, as the length of a coaxial cable or a copper cable increases, the likelihood of noise also increases, so that long-distance data transmission may be difficult. Also, coaxial and copper cables are more susceptible to electromagnetic interference (EMI) between cables, which may deteriorate the quality of transmission data. In addition, cable terminals are expensive, and the compatibility between cables is inferior, so that the manufacturing cost increases, and productivity is low.

For these reasons, the trend in data transmission between liquid crystal display (LCD) monitors or digital apparatuses has been a rapid transition from conventional coaxial or copper cable transmission to optical fiber cable transmission. However, coaxial cables are the present standard for current digital transmission systems such as low voltage differential signal (LVDS), panel link, and Institute of Electrical and Electronics Engineers (IEEE) 1394a standards. Thus, many apparatuses for transmitting and receiving digital data include a dedicated connector for supporting the coaxial cable transmission system.

FIG. 1 is a block diagram illustrating a data transmission system utilizing a conventional coaxial cable, which includes a transmission interface unit 10, a reception interface unit 15, connectors 14a and 14b and a coaxial cable 17.

With reference to FIG. 1, the transmission interface unit 10 converts data to be transmitted into a digital signal, and further converts the digital signal into a form suitable for transmission via the coaxial cable 17. The reception interface unit 15 detects data received via the coaxial cable 17, and converts the detected result from the transmission format back to a digital signal, for use within the system.

FIG. 2 is a block diagram illustrating a data transmission system using a conventional optical fiber cable, which includes a transmission interface unit 20, a reception interface unit 25, connectors 24a and 24b, and an optical fiber cable 27. Here, the transmission interface unit 20 includes a digital signal processing unit 21 and a transducer 23, and the reception interface unit 25 includes a receiver 26 and a digital signal processing unit 28.

As shown in FIG. 2, dedicated connectors 24a and 24b for the optical fiber cable 27 are provided to transmit data using the optical fiber cable 27. Though not shown, for optical transmission, the transducer 23 includes a light emitting element for converting an electrical signal into an optical signal, and the receiver 26 includes a light receiving element for detecting a received optical signal and converting the detected optical signal into an electrical signal.

As described above, the transducer 23 and the receiver 26 include optical devices for converting an electrical signal into an optical signal or converting an optical signal into an electrical signal, in order to transmit data via the optical fiber cable 27.

For this reason, a great deal of time and expense would be required for applying the optical fiber cable transmission system to LCD monitors, since the computer main body and associated connector and cable for data transmission are standardized to specific non-optical standards. In view of this, it is preferable that a data transmission apparatus includes both a connector for a coaxial or copper cable, and a connector for an optical cable in order to retain general utility and compatibility. This results in an increase in cost, which may limit advancement of the use of optical fiber cables.

Furthermore, data transmission between a computer and a peripheral apparatus in current systems is generally realized with a coaxial cable. However, such an interface is the source of many problems. For example, the number of slots on the computer motherboard that can be connected to peripheral apparatuses may be limited due to a limit in data transmission speed. Also, when a cable is connected between the computer body and a peripheral apparatus during operation, noise may be generated due to the abrupt connection, and, as a consequence, the peripheral apparatus may be damaged. Furthermore, as data transmission rate continues to increase, and as the system structure becomes more complicated, the cost of cables likewise increases. In addition, upon interface with peripheral apparatuses, the necessity of high-speed transmission increases, however current standards such as a universal serial bus (USB), for example IEEE 1394, parallel/serial interface, or the like, limits transmission speed to hundreds of MHz/sec. At such relatively slow rates, much time is required for data transmission.

SUMMARY OF THE INVENTION

An object of the present invention is to provide a cable and connector in which a first optical fiber cable connector includes an optical transducer and a second optical fiber cable connector includes an optical receiver, whereby the cable and connector can be applied to a data transmission system supporting coaxial cable transmission, so that high-speed data transmission can be achieved.

Another object of the present invention is to provide an interface system between a computer and associated peripheral apparatuses for optical transmission, by which high-speed data transmission between the computer and the peripherals can be performed using optical fiber cables.

To achieve the first object, there is provided an optical fiber connector and cable having a transducer and a receiver for optical transmission according to an aspect of the present invention. The optical fiber connector and cable includes an optical fiber cable for transferring data in the form of an optical signal. A first connector has a transducer for controlling data transmission, and is connected to one end of the optical fiber cable. A second connector has a receiver for controlling data reception, and is connected to the other end of the optical fiber cable. The first connector is adapted for contacting a coaxial cable connector which is connected to an external transmission interface unit, and the second connector is adapted for contacting a coaxial cable connector which is connected to an external reception interface unit.

To further achieve the first object, there is provided an optical fiber connector and cable having a transducer and a receiver for optical transmission according to another aspect of the present invention. The optical fiber connector and cable includes an optical fiber cable, operating as a transmission line, for transmitting data in the form of optical signals. A first connector has a first transceiver for controlling data transmission and reception, and is connected to a first end of the optical fiber cable. A second connector has a second transceiver for controlling data transmission and reception, and is connected to a second end of the optical fiber cable. Here, the first connector is adapted for contacting a coaxial cable connector which is connected to an external transmission interface unit, and the second connector is adapted for contacting a coaxial cable connector which is connected to an external reception interface unit.

To achieve the second object, there is provided an interface system between a computer and multiple associated peripheral apparatus, including a computer including input and output slots into which a plurality of input-output cards for transmitting and receiving external data are inserted. A first optical fiber cable transmits transmission data and reception data which has been converted into optical signals. A first connector is connected to the computer, and connects the input-output cards which have been inserted into the input-output slots to the first optical fiber cable. A peripheral apparatus unit includes a plurality of peripheral apparatuses and transmits and receives data which has been converted into an optical signal to and from the computer. A second connector is connected to each of the peripheral apparatuses, and connects the first optical fiber cable to the plurality of peripheral apparatuses.

BRIEF DESCRIPTION OF THE DRAWINGS

The foregoing and other objects, features and advantages of the invention will be apparent from the more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF PREFERRED EMBODIMENTS

Figure 1:
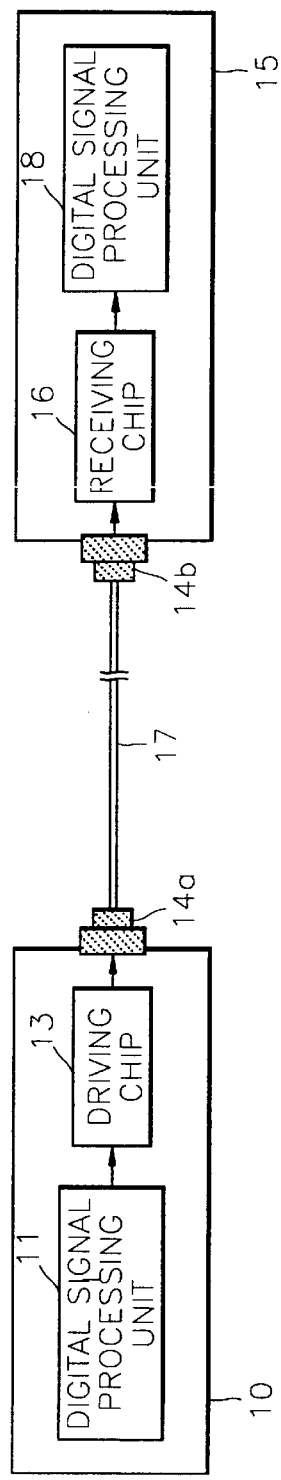
FIG. 1 is a block diagram illustrating a conventional data transmission system using a coaxial cable.
Figure 2:
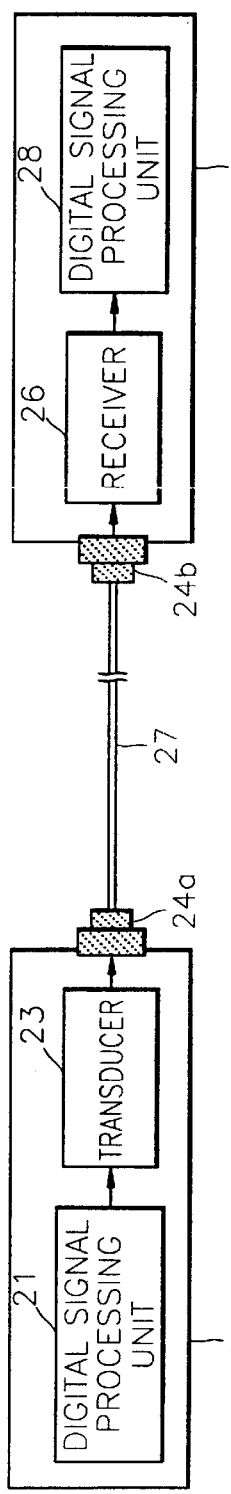
FIG. 2 is a block diagram illustrating a conventional data transmission system using an optical fiber cable.
Figure 3:
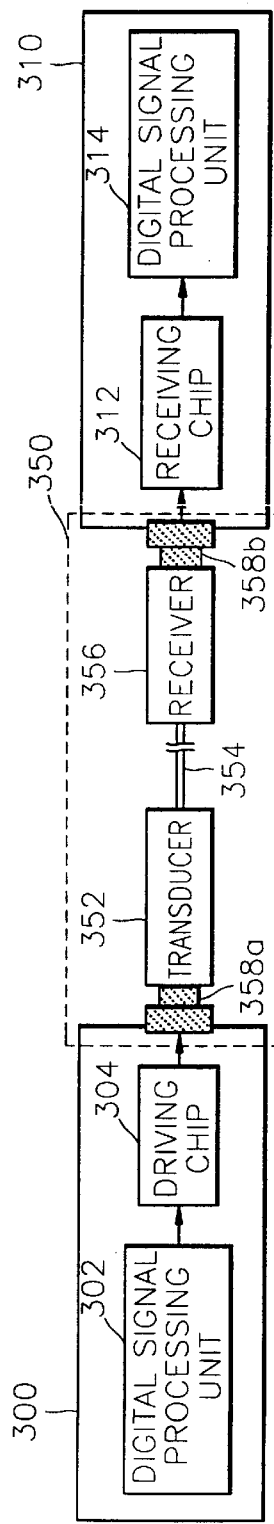
FIG. 3 is a block diagram schematically illustrating a data transmission system employing an optical fiber connector and cable having a transducer and a receiver, according to the present invention.

Referring to FIG. 3, which is a block diagram of a data transmission system to which a connector and cable according to the present invention are applied, the data transmission system includes a transmission interface unit 300, a reception interface unit 310, and a connector and cable 350 having a transducer and a receiver integrated therein.

The transmission interface unit 300 includes a digital signal processing unit 302 and a driving chip 304. The digital signal processing unit 302 converts data to be transmitted into a digital signal, and outputs the digital signal to the driving chip 304. The driving chip 304 converts the digital signal into a format suitable for transmission via a coaxial cable. The converted data is transmitted to the reception interface unit 310 via the transducer-receiver integrated connector and cable 350.

The reception interface unit 310 includes a receiving chip 312 and a digital signal processing unit 314. The receiving chip 312 detects data received from the transmission interface unit 300 via the transducer-receiver integrated connector and cable 350, and converts the detected result from the transmission format into a digital signal. The digital signal processing unit 314 receives the digital signal from the receiving chip 312, and processes the received digital signal according to a predetermined method for use within the system.

The transducer-receiver integrated connector and cable 350 includes an optical fiber cable 354, a transducer 352, a receiver 356, and cable connectors 358a and 358b. In this manner, a transducer and a receiver which are used for optical fiber cable transmission may be integrated with the cable connectors 358a and 358b in order for the optical fiber connector and cable to be compatibly used in a data transmission system which supports a conventional coaxial cable. Alternatively, the transducer 352 and the receiver 356 may be integral with the cable connectors 358a and 358b.

The transducer-receiver integrated connector and cable 350 converts electrical data which is output from the transmission interface unit 300 of the first terminal via the connector 358a, into an optical signal by means of a light-emitting element. The optical signal is transmitted to the receiver 356 via the optical fiber cable 354. The received signal is converted back into an electrical signal in the receiver 356 of the transducer receiver integrated connector and cable 350. The electrical signal is received by the reception interface unit 310 of the second terminal via the connector 358b. The reception interface unit 310 converts the electrical signal received via the transducer receiver integrated connector and cable 350, into a digital signal, and then processes the digital signal according to predetermined techniques.

Figure 4:
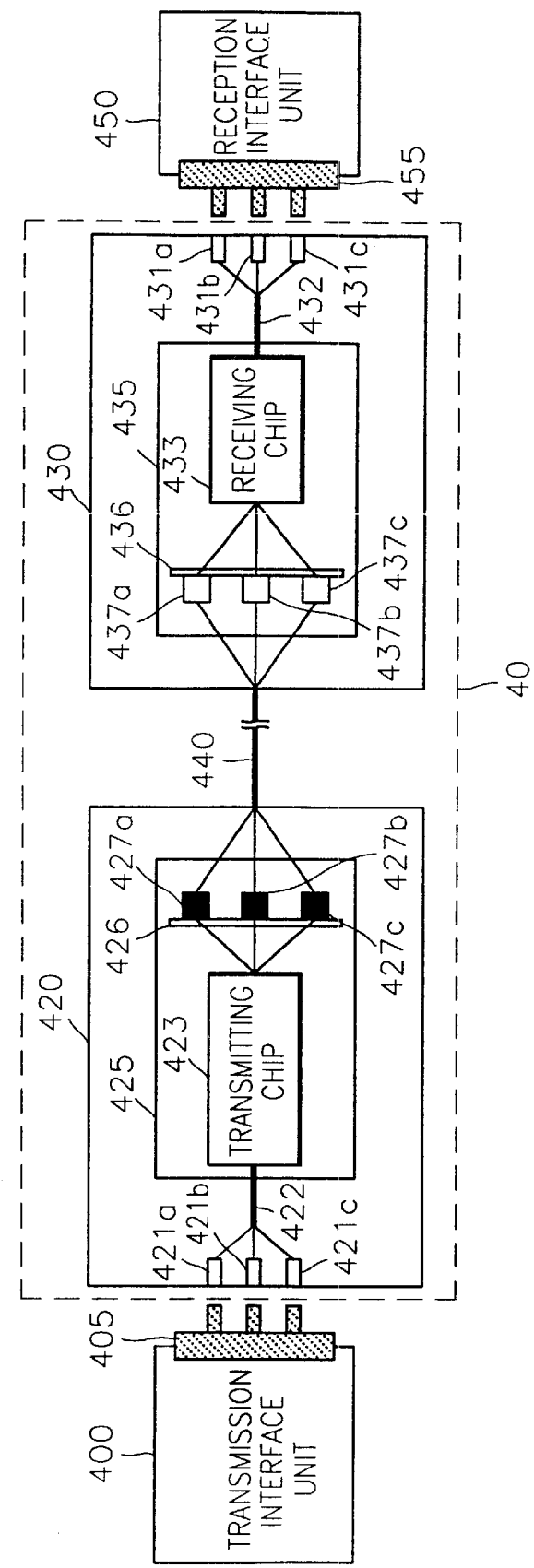
FIG. 4 is a block diagram illustrating an optical fiber connector and cable having a transducer and a receiver, according to an embodiment of the present invention.

FIG. 4 is a block diagram of an optical fiber connector and cable 40 having a transducer and a receiver, according to an embodiment of the present invention. The optical fiber connector and cable shown in FIG. 4 is an example of an application of the present invention to a system in which data transmission is performed in one direction.

Referring to FIG. 4, the transducer-receiver integrated optical fiber connector and cable 40 includes a first optical fiber cable connector 420, an optical fiber cable 440, and a second optical fiber cable connector 430. For convenience in explanation, a transmission interface unit 400 of a transmitting side terminal, a first coaxial cable connector 405, a reception interface unit 450 of a receiving side terminal, and a second coaxial cable connector 455 are also shown in FIG. 4.

The first optical fiber cable connector 420 includes coaxial cable connector insertion portions 421a, 421b and 421c, a coaxial cable 422, and a transducer 425. The transducer 425 which can also be referred to as a converter, includes a transmitting chip 423, a printed circuit board (PCB) 426, and a plurality of light emitting elements 427a, 427b and 427c. It is preferable that the light emitting elements are realized with laser diodes, and that the light emitting elements are inserted into the PCB 426. Other embodiments are equally applicable to the present invention.

Referring to FIG. 4, the first optical fiber cable connector 420 having a transducer 425 receives an electrical signal from the transmission interface unit 400 via the connector insertion portions 421a through 421c and the coaxial cable 422. Also, the first optical fiber cable connector 420 converts the received electrical signal into an optical signal by means of the laser diodes 427a through 427c which are internal light emitting elements. Here, the coaxial cable 422 is preferably of a minimal length for extending between the transmitting chip 423 and the first coaxial cable connector 405. Thereafter, the optical signal is transmitted to the receiver 435 in the second connector 430, via the optical fiber cable 440.

The transmitting chip 423 in the transducer 425 can include a serialization circuit (not shown) and a laser diode driving circuit (not shown). That is, when the number of bits of received data is greater than the number light emitting elements, the serialization circuit operates to control the received data to be converted into a serial signal and output. The laser diode driving circuit generates a driving signal for driving each of the laser diodes 427a, 427b and 472c.

The second optical fiber cable connector 430 includes coaxial cable connector insertion portions 431a, 431b and 431c, a coaxial cable 432, and a receiver 435. The receiver 435 includes a receiving chip 433, a PCB 436, and a plurality of light receiving elements 437a, 437b and 437c. It is preferable that the light receiving elements are realized with photo diodes, and the light receiving elements are inserted on the PCB 436. Other embodiments are equally applicable to the present invention. The photo diodes 437a through 437c in the receiver 435 receive an optical signal from the transmitting side via the optical fiber cable 440, and output a current corresponding to the intensity of the optical signal. The receiving chip 433 detects received data from the output current, and the detected result is output to the reception interface unit 450 of an external terminal.

The optical fiber connector and cable 40 shown in FIG. 4 may include more than six coaxial cable connector insertion portions, more than three light emitting elements, and more than three light receiving elements. However, for convenience of explanation, six coaxial cable connector insertion portions 421a through 421c and 431a through 431c, three light emitting elements 427a through 427c, and three light receiving elements 437a through 437c are shown in FIG. 4.

Though not shown in detail, the coaxial cable connectors 405 and 455 may be designed according to a structure whereby they are inserted into the optical fiber cable connectors 420 and 430 of FIG. 4. Alternatively, the optical fiber cable connectors 420 and 430 may have protruding connector insertion portions 421a through 421c, such that they can be inserted into the coaxial cable connectors 405 and 455. It will also be apparent to those skilled in the art that the connection structure of connectors can be variously realized according to the design system of the connectors. In FIG. 4, the optical fiber cable connectors 420 and 430 are referred to as plug assemblies, and the coaxial cable connectors 405 and 455 are referred to as receptacle assemblies.

Figure 5:
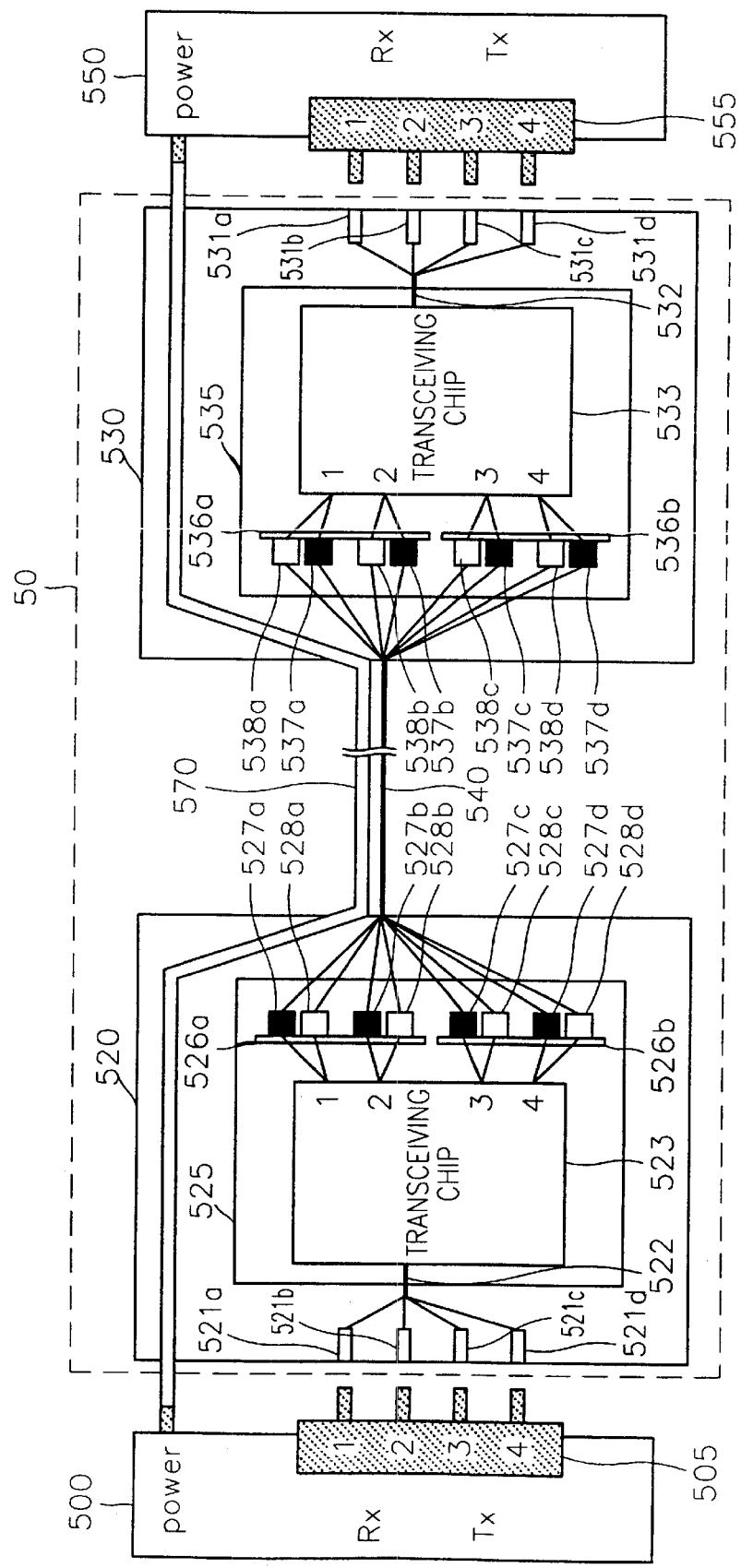
FIG. 5 is a block diagram illustrating an optical fiber connector and cable having a transducer and a receiver, according to another embodiment of the present invention.

FIG. 5 is a block diagram illustrating an optical fiber connector and cable 50 having a transducer and a receiver, according to another embodiment of the present invention. The optical fiber connector and cable 50 of FIG. 5 is an example of an application of the present invention to a system in which data transmission can be performed bidirectionally.

Referring to FIG. 5, the optical fiber connector and cable 50 having a transducer and a receiver includes a first optical fiber cable connector 520, an optical fiber cable 540, and a second optical fiber cable connector 530. For convenience of explanation, a first interface unit 500 for transmission and reception of a first terminal, a first coaxial cable connector 505, a second interface unit 550 for transmission and reception of a second terminal, and a second coaxial cable connector 555 are also shown in FIG. 5.

The first connector 520 for an optical fiber cable shown in FIG. 5 includes a plurality of coaxial cable connector insertion portions 521a through 521d, a coaxial cable 522 and a first transceiver 525. The first transceiver 525 includes a transceiving chip 523, PCBs 526a and 526b, a plurality of laser diodes 527a through 527d and a plurality of photo diodes 528a through 528d.

The first connector 520 is connected to one end of the optical fiber cable 540, and the second connector 530 is connected to the other end thereof. Also, the optical fiber cable 540 may optionally be combined with a coaxial power cable 570 for supplying power, the combination covered by a covering material.

The second connector 530 includes a second transceiver 535, a coaxial cable 532, and a plurality of coaxial cable connector insertion portions 531a through 531d. The second transceiver 535 includes PCBs 536a and 536b, a plurality of photo diodes 538a through 538d, a plurality of laser diodes 537a through 537d, and a transceiving chip 533.

For the case where the optical fiber cable/connector 50 shown in FIG. 5 is applied to an bidirectional transmission system such as IEEE 1394, the first and second interface units 500 and 550 may be analog interface units which exist in the physical hierarchical chips of different nodes, respectively. In an IEEE 1394 interface system, bidirectional transmission is performed between nodes. Thus, the IEEE 1394 interface system generally requires two lines for supplying power supply voltage VCC/GND, two lines for transmission (Tx), and two lines for reception (Rx) as a transmission cable. The requirement of two lines for each transmission and reception because data in the IEEE 1394 interface system is transmitted according to a differential configuration.

The first connector 520 in FIG. 5 includes a transceiving chip 523 within the first transceiver 525 to simultaneously control transmission and reception of data. Also, the laser diodes 527a through 527d and the photo diodes 528a through 528d make pairs to bidirectionally transmit and receive data. The detailed configuration of the transceiving chip 523 will be described below with reference to FIG. 6.

Similar to the first connector 520, the second connector 530 includes a transceiving chip 533 within the second transceiver 535 to simultaneously control transmission and reception of data. The laser diodes 537a through 537d and the photo diodes 538a through 538d are configured in pairs for bi-directionally transmitting and receiving data. The transceiving chip 533 has the same configuration as that of the transceiving chip 523 in the first transceiver 525.

Referring to FIG. 5, a power supply voltage may be supplied using a two-line coaxial cable 570 which is used for conventional coaxial cable transmission. That is, the two-line coaxial cable 570 is realized with a cable/connector which has been combined and covered together with the optical fiber cable 540 and integrated therewith.

Also, as shown in FIG. 5, for bidirectional transmission using an optical fiber cable, data transmission lines are each extended into two lines. In conventional coaxial cable transmission, a single line is used for both transmission and reception. However, upon optical fiber cable transmission, a light emitting element for transmission and a light receiving element for reception are connected separately, so that each transmission/reception line is combined into two lines. For example, if a coaxial cable includes two lines for transmission (Tx) and two lines for reception (Rx), the optical fiber cable 540 includes (2×2+2×2) lines. That is, a transmission line is extended to four transmission lines and four reception lines, so the optical fiber cable includes a total of eight lines.

However, as described above, several issues need to be addressed in order to provide a full replacement of the coaxial cable transmission supported by the IEEE 1394 interface system with optical fiber cable transmission. First, in order to accommodate data transmission speeds of various apparatuses within a network, a common signal level corresponding to each of the transmission speeds is changed in IEEE 1394. To be more specific, different data transmission speeds between networks can be expressed by determining the amplitude of a pulse on the basis of the common signal level. However, changing the common signal level is possible only upon coaxial cable transmission. Thus, upon transmission using an optical fiber cable, a circuit for controlling the duty of transmission data instead of setting a common signal level may be added to express different data transmission speeds. As described above, in the preferred embodiment shown in FIG. 5, a circuit for converting the voltage level of a signal to be transmitted in the form of a duty cycle can be further installed within the transceivers 525 and 535 of the first and second connectors 520 and 530 to express different data transmission speeds. A circuit for detecting the duty of a received signal and converting the duty into a voltage level upon data reception can likewise be provided to accommodate date transmission in the opposite direction.

Also, upon coaxial cable transmission capable of bidirectional transmission using one line, input and output data may co-exist on the same line. As such, a uncertain state in which binary "0" level and binary "1" level signals meet, that is, a high impedance (Z) state, may occur. In IEEE 1394, this Z state may be used for data transmission. However, when an optical fiber cable is applied to the IEEE 1394 interface system, the high impedance state is not representable. Thus, in the IEEE 1394 interface system, a high impedance state can be realized using coaxial cables 522 and 532 of the first and second connectors 520 and 530 of FIG. 5.

Referring to FIG. 5, the laser diodes 527a through 527d of the first transceiver 525 are connected to the photo diodes 538a through 538d of the second transceiver 535 via the optical fiber cable 540. Current leakage during data transmission may be caused due to the structural characteristics in which the laser diodes for transmission in the first transceiver 525 are connected to the photo diodes for reception in the second transceiver 535. Thus, in order to prevent current leakage, the flow of current is completely prevented by connecting a diode between the first transceiver 525 and each of the photo diodes 528a through 528d or between the second transceiver 535 and each of the photo diodes 538a through 538d.

According to the present invention as described above, problems that may be generated in an IEEE 1394 interface system which is used only for a coaxial cable, can be solved, and stable data transmission at high speed can be achieved using an optical fiber cable.

Figure 6:
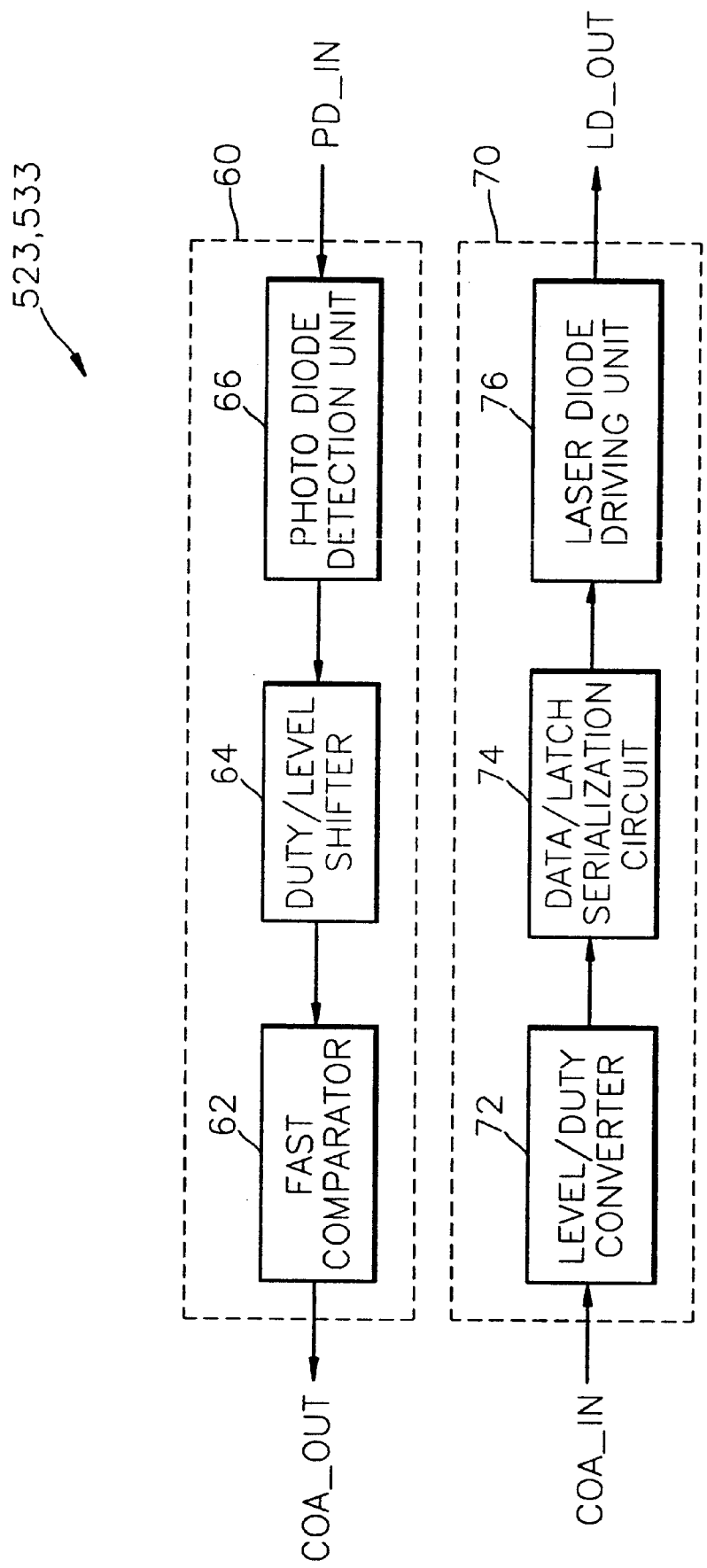
FIG. 6 is a block diagram of an embodiment of the transceiving chip of the connector shown in FIG. 5.

FIG. 6 is a block diagram of an embodiment of the transceiving chips 523 and 533 in the first and second connectors 520 and 530 shown in FIG. 5. The transceiving chips 523 and 533 include a reception control unit 60 and a transmission control unit 70. Here, the transceiving chip shown in FIG. 6 is assumed to be the transceiving chip 523 included in the first connector 520.

The reception control unit 60 includes a high-speed comparator 62, a duty/level shifter 64, and a photo diode detection unit 66. The reception control unit 60 controls reception so that an optical signal is converted into an electrical signal and the electrical signal is received, when data is received from an external node via a node to which the first interface unit 500 is applied. The photo diode detection unit 66 detects the intensity of an optical signal externally applied via a photo diode PD_IN, and converts the detected result into a current. The duty/level shifter 64 translates the electrical current from the photo diode detection unit 66 into a corresponding voltage level. The high-speed comparator 62 converts the voltage level of a signal output from the duty/level shifter 64 on the basis of the common signal level, and outputs the converted result via the coaxial cable COA_OUT.

The transmission control unit 70 includes a level/duty converter 72, a data latch/serialization circuit 74, and a laser diode driving unit 76. The transmission control unit 70 controls transmission so that an electrical signal is converted into an optical signal and the optical signal is transmitted, when data is transmitted from a node to which the first interface unit 500 pertains, to an external node. To be more specific, the level/duty converter 72 converts the output level of a signal applied via a coaxial cable COA_IN to a corresponding duty, and then outputs the converted result. The data latch/serialization circuit 74 latches the output signal of the level/duty converter 62, and serializes the latched signal. The laser diode driving unit 76 generates a driving signal for driving a laser diode which is a light emitting element, in order to convert the signal output from the data latch/serialization circuit 74 into an optical signal.

As described above, the first and second connectors 520 and 530 of the present invention further include the duty/level shifter 64 and the level/duty converter 72, respectively, in order to translate between data transmission speed for optical transmission and common signal level for cable transmission. In addition to IEEE 1394 systems, the optical fiber connector and cable having a transducer and a receiver according to the present invention is readily applicable to all types of data transmission systems which exclusively employ a coaxial cable.

As described above, when data transmission using an optical fiber cable confers many advantages over conventional systems. In particular, when an optical fiber cable is used in an interface system between a computer and its peripheral apparatuses, high-speed transmission is possible, permitting an increase in the number of input and output slots in a computer. Also, when data is transmitted via an optical fiber cable, direct electrical contact can be eliminated. Thus, a hot plug-and-play function in which reception of a signal by a connector is automatically recognized can be reliably realized. Also, the data transmission speed of optical transmission is faster than that of a universal serial bus (USB) such as an IEEE 1394 or general parallel/serial transmission. That is, when an optical fiber cable transmission is used, high-speed transmission rates of several GHz can be realized. Examples of peripheral apparatus that can be interfaced with a computer include a digital still camera, a moving picture experts group 3 (MPEG3) system, a video tape recorder (VTR), or the like. Thus, when the interface system between peripheral apparatuses and a computer is realized using an optical fiber cable, many advantages can be obtained.

Figure 7:
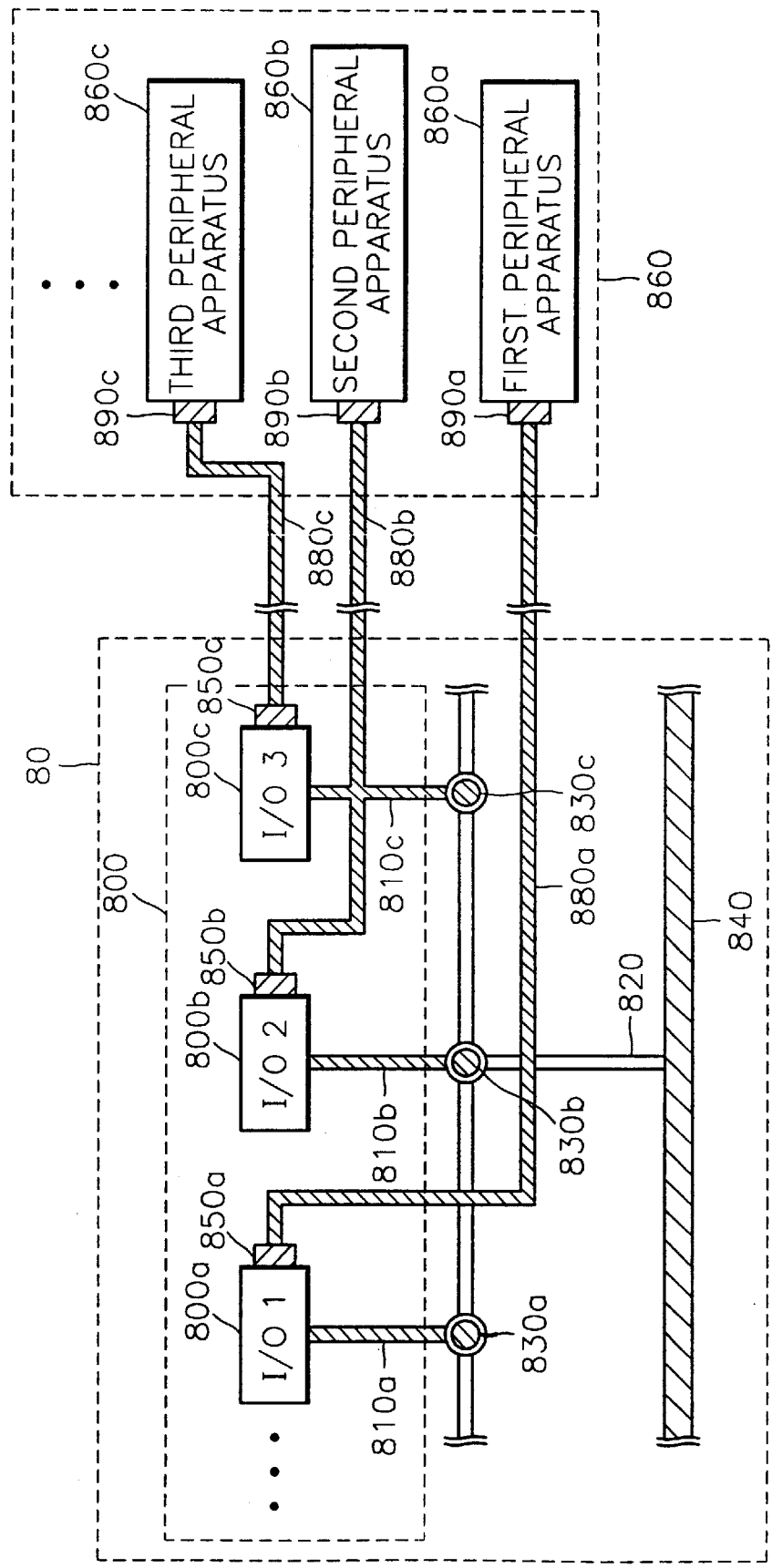
FIG. 7 is a block diagram illustrating an interface system between a computer and its peripheral apparatuses using an optical fiber cable, according to an embodiment of the present invention.

FIG. 7 is a block diagram illustrating an interface system between a computer and its peripheral apparatuses for optical transmission, according to an embodiment of the present invention. The interface system includes a computer 80, a peripheral apparatus unit 860, and optical fiber cables 880a, 880b and 880c. Also, in order to transmit and receive data using the optical fiber cable 880a, 880b and 880c, the computer 80 and the peripheral apparatus unit 860 include optical fiber cable dedicated connectors 830a through 830c, 850a through 850c, and 890a through 890c.

An input and output interface unit 800 in the computer of FIG. 7 includes a plurality of input and output slots I/O1,I/O2 and I/O3 800a through 800c on which PCI devices can be mounted. Though not shown, these input/output slots 80a through 80c can be included within a mother board (not shown). Also, a greater number of input and output slots can be formed in the mother board, but, for simplification in the drawings, three input and output slots are shown in FIG. 7. To perform transmission and reception of data to and from external peripheral apparatuses, a plurality of PCI cards are inserted into the slots. In FIG. 7, the optical fiber cable dedicated connectors 850a and 850b attached to the console, or case, of the computer are connected to one side of the PCI cards which are inserted into the input and output slots. Here, the connectors 850a through 850c are realized with a receptacle assembly which is attached to the case, and a plug assembly which is flexibly inserted into the receptacle assembly.

In the computer 80, the data bus 840 for rapid transmission of data is connected between a central processing unit (not shown) and the PCI bus 820. The PCI bus 820, as shown in FIG. 7, is connected to the input and output slots 800a through 800c via the optical fiber cables 810a through 810c. In order to connect the PCI bus 820 to the optical fiber cables 810a through 810c, connectors 830a through 830c are included within the computer. However, according to a system realization method, a coaxial cable instead of the optical fiber cable 810a through 810c can be used as in conventional configurations.

In the peripheral apparatus unit 860, optical cable connectors 890a through 890c are included to connect the peripheral apparatuses 860a through 860c to an external optical fiber cable 880a through 880c.

Here, the connectors 830a through 830c for connecting the PCI bus 820 connected to the data bus 840 in the PC, to the optical fiber cables 810a through 810c between the PCI bus 820 and the input and output slots, are referred to as first connectors. Also, coupling connectors 850a through 850c for connecting the optical fiber cables 810a through 810c within the PC to the external optical fiber cables 880a through 880c are referred to as second connectors. The connectors 890a through 890c for connecting the peripheral apparatuses 860a through 860c to the optical fiber cables 880a through 880c are referred to as third connectors.

As described above, the systems on both sides include optical cable connectors to connect a computer to its peripheral apparatuses via an optical fiber cable.

Figure 8:
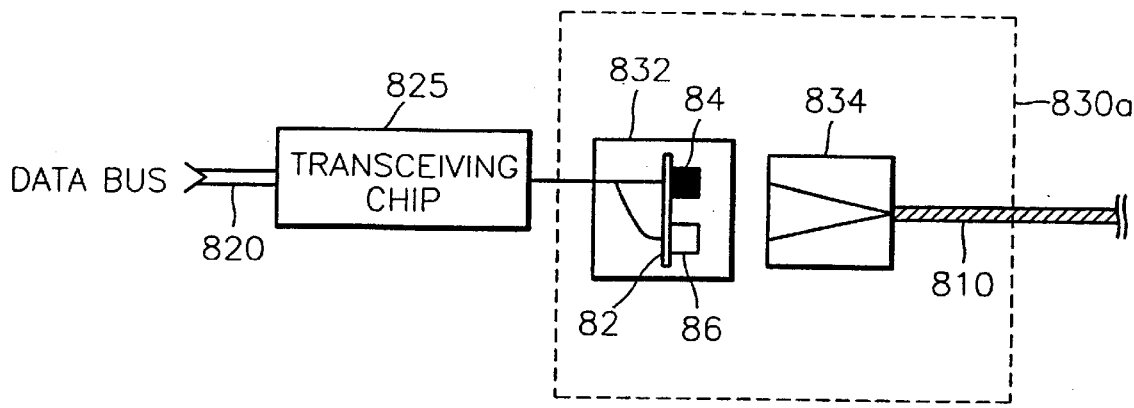
FIG. 8 is a block diagram of a first connector of the interface system shown in FIG. 7.

FIG. 8 is a block diagram of an embodiment of one of the first connectors 830a through 830c, in which a first connector 830a is taken as an example, among optical fiber cable connectors of the interface system between a computer and its peripheral apparatuses shown in FIG. 7. Referring to FIG. 8, the first connector 830a includes a receptacle assembly 832 and a plug assembly 834. Also, a transceiving chip 825 is separately installed to transmit and receive data in the form of an optical signal, and connected to the first connector 830a.

In FIG. 8, the transceiving chip 825 is controlled so that electrical data received via the data bus 840 and the PCI bus 820 is converted into an optical signal or received optical signals are converted into electrical signals. The transceiving chip 825 has the same configuration as that shown in FIG. 7, so it will not be described again.

The receptacle assembly 832 in the first connector 830a of FIG. 8 includes a PCB 82, a laser diode 84, and a photo diode 86. The PCB 82 is a board on which the laser diode 84 and the photo diode 86 are inserted. Here, each of the laser diode 84 and the photo diode 86 performs the same function as those in the cable/connectors shown in FIGS. 4 and 5. The plug assembly 834 is connected to the optical fiber cable 810 and inserted into the receptacle assembly 832.

Figure 9:
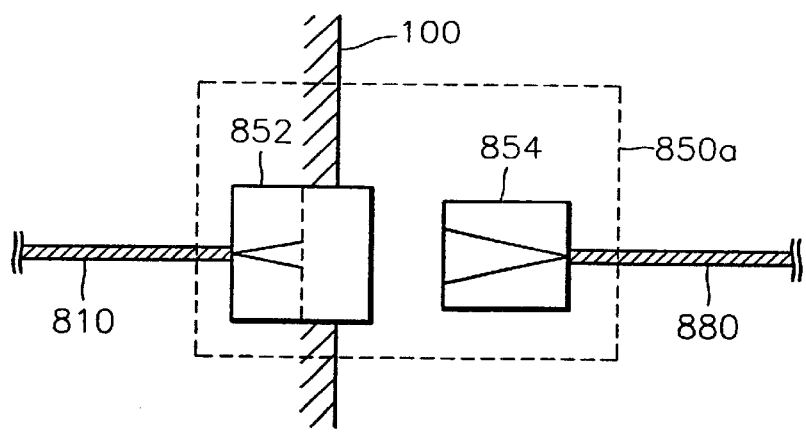
FIG. 9 is a block diagram of a second connector of the interface system shown in FIG. 7.

FIG. 9 is a block diagram of an embodiment of one of the second connectors 850a through 850c, in which a second connector 850a is taken as an example, in the interface system between a computer and its peripheral apparatuses shown in FIG. 7.

The second connector 850a includes a receptacle assembly 852 and a plug assembly 854. The receptacle assembly 852 is included in a PC case 100.

The second connector 850a shown in FIG. 9 connects an optical fiber cable 810a within the PC case to an external optical fiber cable 880a. Thus, the second connector 850a can connect the computer to the external optical fiber cable even if it includes no light receiving elements or light emitting elements. However, when the optical fiber cable 810a is not connected to the computer and a conventional electrical cable is used, the second connector 850a includes a light emitting element and a light receiving element.

Figure 10:
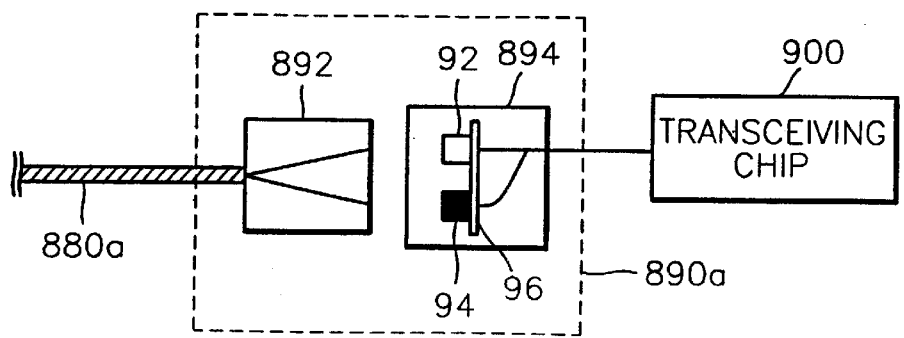
FIG. 10 is a block diagram of a third connector of the interface system shown in FIG. 7.

FIG. 10 is a block diagram of an embodiment of one of the third connectors 890a through 890c, in which a third connector 890a is taken as an example, in the interface system between a computer and its peripheral apparatuses shown in FIG. 7. The third connector 890a includes a plug assembly 892 and a receptacle assembly 894. Here, a transceiving chip 900 is separately included within the peripheral apparatuses to transmit and receive data in the form of an optical signal.

Referring to FIG. 10, the receptacle assembly 894 includes a photo diode 92, a laser diode 94, and a PCB 96. The photo diode 92 and the laser diode 94 are inserted on the PCB 96.

As shown in FIG. 10, the third connector 890a may have the same structure as the first connector 830a shown in FIG. 8. That is, the receptacle assembly 894 included on the peripheral apparatus side includes a light emitting element and a light receiving element, and the plug assembly 892 is connected to one end of the optical fiber cable 880a.

As described above, the interface system between a computer and its peripheral apparatuses shown in FIG. 7 replaces the internal electrical cables with optical fiber cables, and includes corresponding connectors, thus making rapid data transmission possible. Here, the electrical cables that can be replaced by optical fiber cables can be IDE connectors within the computer, in addition to those shown in FIG. 7.

In the interface system between a computer and its peripheral apparatuses, when only external transmission cables are to be replaced, the optical fiber connector and cable having a transducer and a receiver shown in FIG. 5 may be applied.

According to an optical fiber connector and cable of the present invention, a transducer and a receiver which are used for optical fiber cable transmission are installed in a connector of an optical fiber cable. Therefore, the optical fiber connector and cable can be compatibly used in digital data transmission systems which exclusively use a coaxial cable. Also, since the interface system between a computer and its peripheral apparatuses uses an optical fiber cable rather than a coaxial cable as a transmission cable, data transmission speed and performance can be improved. Furthermore, the use of the optical fiber cable in the present invention increases the speed of data transmission between systems, so that rapid transmission is possible.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. An optical fiber connector and cable comprising:
    an optical fiber cable for transferring data in the form of optical signals;
    a first connector having a first transceiver for controlling data transmission and reception, the first connector connected to a first end of the optical fiber cable; and
    a second connector having a second transceiver for controlling data transmission and reception, the second connector connected to a second end of the optical fiber cable,
    wherein the first connector is adapted to contact a first coaxial cable connector which is connected to a first interface unit, and the second connector is adapted to contact a second coaxial cable connector which is connected to a second interface unit, and wherein the first and second transceivers each convert an electrical signal received via the respective first or second coaxial cable connectors into an optical signal that is provided to the optical fiber cable and convert the optical signal that is received on the optical fiber cable to a digital electrical signal that is provided to the respective first or second coaxial cable connector,
    wherein each of the first and second connectors comprises:
        a connector insertion portion which is inserted into the coaxial cable connector connected to the first or second interface unit;
        a coaxial cable having a first end connected to the connector insertion portion; and
        a transceiver connected between a second end of the coaxial cable and the optical fiber cable, for converting an electrical signal into an optical signal and transmitting the optical signal via the optical fiber cable, and for converting an optical signal received via the optical fiber cable into the digital electrical signal and transmitting the electrical signal via the coaxial cable
    wherein the transceiver comprises:
        at least one light emitting element for converting an electrical signal to be transmitted into an optical signal;
        at least one light receiving element for converting an optical signal received via the optical fiber sable into an electrical signal; and
        a transceiving chip for controlling the conversion of an electrical signal to be transmitted or received to or from the first and second interface units, into an optical signal suitable for optical transmission, and for generating a driving signal for driving the light emitting element and the light receiving element; and,
    wherein the transceiving chip comprises:
        a light receiving element detection unit for detecting the intensity of an optical signal which is applied to the light receiving element, and for generating a current corresponding to the detected intensity;
        a duty/level shifter for converting the duty of the current generated by the light receiving element detection unit to a voltage level;
        a high-speed comparator for converting the level of the output signal of the duty/level shifter on the basis of a predetermined common) signal level, and outputting the converted result via the coaxial cable;
        a level/duty converter for shifting the output level of a signal received via the coaxial cable into a corresponding duty;
        a data latch/serialization circuit for latching the output of the level/duty converter and converting the latched result into serial data; and
        a light emitting element driving unit for receiving the output of the data latch/serialization circuit and generating a driving signal for driving the light omitting element.

2. The optical fiber connector and cable of claim 1, further comprising a power supply coaxial cable integrally coated with the optical fiber cable.

3. An interface system for interconnecting a computer with a peripheral apparatus, comprising:
    a computer including a plurality of input and output slots for a plurality of input-output cards, the plurality of input and output slots being coupled to a common first data bus that transfers internal data, the first data bus comprising a common data bus for rapidly transmitting the internal data to a central processing unit and a PCI bus for connecting the common data bus to the input-output slots, the input-output cards for transmitting and receiving external data;
    a first optical fiber cable for transferring the external data in the form of optical signals;
    a first connector for connecting the input-output cards to the first optical fiber cable;
    a peripheral apparatus unit including a plurality of peripheral apparatuses for transmitting and receiving the external data in the form of optical signals, to and from the computer;
    a second connector connected to each of the peripheral apparatuses, for connecting the first optical fiber cable to the plurality of peripheral apparatuses the second connector comprising at least one light receiving element for detecting an optical signal received frog the computer via the first optical fiber cable and at least one light emitting element for generating an optical signal for transmission to the computer via the first optical fiber cable;
    a second optical fiber cable for optically connecting the PCI bus to the input-output slots;
    a third connector for connecting the second optical fiber cable to the PSI bus, the third connector comprising at least one light receiving element for detecting an optical signal received from the peripheral apparatuses via the second optical fiber cable;

at least one light emitting element for generating an optical signal for transmission to the peripheral apparatuses via the second optical fiber cable; and a transceiving chip connected to a first end of the third connector, for controlling the conversion of an electrical signal received via the PCI bus into an optical signal suitable for optical transmission, and for generating a driving signal for driving the light emitting elements and the light receiving elements.

4. The interface system of claim 3, wherein the transceiving chip comprises:

a light receiving element detection unit for detecting the intensity of an optical signal which is applied to the light receiving element, and generating a current corresponding to the detected intensity;

a duty/level shifter for shifting the duty of the current generated by the light receiving element detection unit to a voltage level;

a high-speed comparator for converting the level of the output signal of the duty/level shifter on the basis of a predetermined common signal level, and outputting the converted result via the coaxial cable;

a level/duty converter for converting the output level of a signal into a corresponding duty;

a data latch/serialization circuit for latching the output of the level/duty converter and converting the latched result into serial data; and a light emitting element driving unit for receiving the output of the data latch/serialization circuit and generating a driving signal for driving the light emitting element.

* * * * *

UNITED STATES PATENT AND TRADEMARK OFFICE
CERTIFICATE OF CORRECTION

PATENT NO.   : 6,502,997 B1               Page 1 of 1
DATED        : January 7, 2003
INVENTOR(S)  : Bang Won Lee et al.

It is certified that error appears in the above-identified patent and that said Letters Patent is hereby corrected as shown below:

Column 12,
Line 2, delete "sable" and insert -- cable --.
Line 21, delete the ")" after "common".
Line 59, delete "frog" and insert -- from --.
Line 67, delete "PSI" and insert -- PCI --.

Signed and Sealed this

Twenty-fourth Day of June, 2003

JAMES E. ROGAN
*Director of the United States Patent and Trademark Office*